S. J. BOWERS.
Horse-Collar Coupling.
No. 210,237.  Patented Nov. 26, 1878.
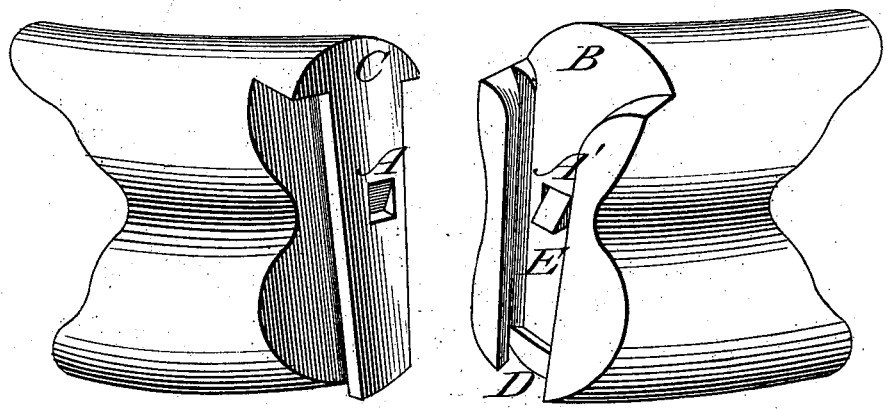

UNITED STATES PATENT OFFICE.

SYLVESTER J. BOWERS, OF CANANDAIGUA, NEW YORK.

IMPROVEMENT IN HORSE-COLLAR COUPLINGS.

Specification forming part of Letters Patent No. 210,237, dated November 26, 1878; application filed August 31, 1878.

*To all whom it may concern:*

Be it known that I, SYLVESTER J. BOWERS, of Canandaigua, county of Ontario, and State of New York, have invented a new and useful Improvement in Horse-Collar Couplings, which improvement is fully set forth in the following specification, reference being had to the accompanying drawings.

The object of my invention is to prevent accidents, which are liable to occur with all horse-collar couplings opening at the bottom, by providing a substantial lock or fastener to hold the coupling together after it is adjusted; also, facilitate the adjustment of the dovetail coupling by making a wide entrance to the groove, which is very essential for the use of a particular class of collars called "box or close-top collars," which are very stiff and obstinate to the side movement necessary for the adjustment of the dovetail coupling. The present dovetail coupling, with its narrow entrance, excludes almost entirely this class of collars from the use of it. This difficulty will be entirely obviated by the introduction of the wide entrance.

My other improvements consist in extending the groove the entire length of the fastening end, which facilitates the manufacturing, requiring less coring in casting. It will be noticed in the dovetail coupling the wedge-shaped tongue and groove make it necessary for a stop to prevent the wedging in of the tongue, so that it could not be easily removed. This stop is at the bottom of all dovetail couplings now in use, thereby increasing the expense of manufacturing.

My improvement opens the groove at the bottom, making it easier cast, and places a stop-cap at the top to prevent wedging, and makes a very good finish by entirely hiding from view the wide entrance. Besides I inclose the straw or other stuffing of the collar at the ends where cut apart, and prevent it (the stuffing) coming out by forming a solid partition against the ends of the collar, exposing the stuffing.

In the drawing, A represents a tenon or tongue on one portion of the locking device, and is provided with a stop, C, upon its upper side. A' is a groove in the opposite portion of the device, having an enlarged opening, B, upon its upper edge or side to facilitate the entrance of the tenon or tongue. The groove A' extends entirely across the inner face of one portion of the fastening, and the tongue or tenon are of equal length upon the other portion.

What I claim is—

A collar-fastener composed of two portions adapted to fit upon the free ends of a collar, one of which is provided with the tongue or tenon A, having a stop, C, upon the upper end, the other having a groove, A', with an enlarged opening, B, upon its upper side, to facilitate the entrance of the tongue or tenon, all substantially as shown and described.

SYLVESTER J. BOWERS.

Witnesses:
  H. B. BRACE,
  A. HEMENWAY.